United States Patent [19]

Morin et al.

[11] Patent Number: 5,643,500

[45] Date of Patent: Jul. 1, 1997

[54] METHODS FOR INHIBITING WATER CORROSION IN CRUDE OIL PIPELINES

[75] Inventors: Bruno Morin; Alan E. Goliaszewski, both of The Woodlands, Tex.

[73] Assignee: BetzDearborn Inc., Trevose, Pa.

[21] Appl. No.: 505,934

[22] Filed: Jul. 24, 1995

Related U.S. Application Data

[63] Continuation-in-part of Ser. No. 223,923, Apr. 6, 1994, abandoned.

[51] Int. Cl.$^6$ .................................................. C23F 11/14
[52] U.S. Cl. ........................ 252/392; 208/47; 507/939; 422/16; 585/950
[58] Field of Search .......................... 208/47; 507/939; 422/16; 252/392; 585/950

[56] References Cited

U.S. PATENT DOCUMENTS

| | | | |
|---|---|---|---|
| 3,211,667 | 10/1965 | Coyne et al. | 252/392 |
| 4,467,366 | 8/1984 | Edmondson | 208/47 |

*Primary Examiner*—Sharon Gibson
*Assistant Examiner*—Valerie Fee
*Attorney, Agent, or Firm*—Alexander D. Ricci; Philip H. Von Neida

[57] ABSTRACT

The present invention is directed towards the use of a reaction product of an alkynediol and a polyalkylene polyamine to inhibit metal surface corrosion caused by water present in the hydrocarbons in oil pipelines.

9 Claims, No Drawings

5,643,500

METHODS FOR INHIBITING WATER CORROSION IN CRUDE OIL PIPELINES

This a CIP Application of application Ser. No. 08/223,923, filed Apr. 6, 1994, now abandoned.

FIELD OF THE INVENTION

The present invention is directed toward the use of the reaction product of alkynediols and polyalkylene polyamine compounds to inhibit the corrosion of metal surfaces in pipelines due to the presence of a separate water phase in a pipeline transporting hydrocarbon fluids.

BACKGROUND OF THE INVENTION

Corrosion has always been and is currently a significant problem in the petroleum industry because of the necessary replacement costs and downtime associated therewith. This problem is true of the internal metal surfaces of transport pipelines.

Crude oil pipelines, for example, transport the production from one oilfield to a refinery, different grades of crude from different sources, or different crudes to different refineries along a pipeline route.

Pipelines often carry crude oil, or refined products, that have small amounts of water present. Current crude oil pipeline specifications allow for the presence of up to 5,000 volume ppm of water which is beyond the saturation point at normal temperatures. Corrosion of the metal surfaces of the pipeline is caused by accumulations of water. This occurs in the lower sections of the pipe or in areas of sludge accumulation, where water will separate from the hydrocarbon. This water will often be found to contain impurities such as chloride salts of calcium, magnesium and sodium, as well as bicarbonate, lower carboxylate, bisulfide ions, and the like which can contribute to the metal corrosion.

In view of the foregoing, industry is looking for techniques and inhibitors to combat corrosion caused by water present in the hydrocarbon to alleviate problems with the transport of crude oils via pipeline.

SUMMARY OF THE INVENTION

The present invention relates to methods for inhibiting the corrosion of metal surfaces in crude oil pipelines. The hydrocarbons in these pipelines have water present therein and the water will separate from the hydrocarbons. This water will accumulate along the bottom quadrant of the pipeline and its persistent contact with the metal surfaces, if left untreated, will result in the corrosion of the metal.

The present inventors have discovered that this water-induced corrosion can be inhibited by adding to the hydrocarbon an effective corrosion inhibiting amount of the reaction product of an alkynediol and a polyakylene polyamine.

DESCRIPTION OF THE RELATED ART

The reaction product of the present invention is taught in U.S. Pat. No. 4,647,366, Edmondson. The reaction product is employed to inhibit corrosion caused by propionic acid in a solution with a hydrocarbon. This metal corrosion is acid induced and occurs at the elevated temperatures associated with hydrocarbon processing conditions, such as in a crude oil distillation unit, and in a substantially water-free hydrocarbon/propionic acid mixture.

This method is different from applicants' invention in several fundamental respects. Edmondson utilizes the reaction product in a high temperature, substantially water free (e.g., 0.5–500 ppm), oil refining process to inhibit corrosion caused by propionic acid. Propionic acid is an example of carboxylic acids, for which there is a growing body of knowledge that corrosion is induced in water-free streams only at elevated temperatures (300°–750° F.). See NACE Publications Corrosion 93, 631/4 and Corrosion 96, 334/5. Any water present is soluble in the hydrocarbon at process temperatures. For example, up to 7162 ppm of water can be soluble in a typical kerosene at 350° F. as calculated by the method given in the API Technical Data Book, 3rd Ed., p. 9–17. Even at 120° F., 202 ppm of water can be soluble in a typical light crude oil.

The present invention utilizes the reaction product in oil pipelines that carry low temperature hydrocarbons having a sufficient amount of water present therein to cause metal surface corrosion.

The differences between applicants' invention and Edmondson are fourfold. Edmondson treats hydrocarbons undergoing refining procedures at high temperatures. Applicants treat hydrocarbons that are being transported in oil pipelines at low temperatures. Edmondson mandates that the system be as water free as possible and no separate aqueous phase ever exists. Applicants' system necessarily needs water present and corrosion problems result from the presence of corrodants in a separate aqueous phase. The causes of corrosion are different as Edmondson treats propionic acid induced corrosion which is known to occur at significant rates only at elevated temperatures. Applicants treat corrosion due to contact of metal with an aqueous phase, induced by different corrodants than discussed by Edmondson. These are two entirely different phenomena dependent upon the environment the hydrocarbon is present in.

U.S. Pat. No. 3,211,667, Coyne et al., teaches a method of generating the reaction product and the means for inhibiting ferrous metal corrosion due to corrosive aqueous media. Coyne addresses a specific form of oxygen corrosion known as filiform corrosion. The applications discussed in Coyne are, for the most part, in contact with and saturated with air. To some degree, oxygen is present in all the systems treated in Coyne. This disclosure differs from the instant invention in that Coyne inhibits corrosion in all aqueous systems where oxygen is present while the present invention operates where sedimentation of a minor amount of water in an oil matrix causes corrosion under substantially anaerobic conditions. The anaerobic nature of these systems is indicated by the observation of anaerobic (sulfate reducing) bacterial growth.

DETAILED DESCRIPTION OF THE INVENTION

The present invention is directed towards methods for inhibiting the corrosion of metal surfaces in crude oil pipelines in contact with crude oils that contain water wherein the water under substantially anaerobic conditions will cause corrosion of the metal surfaces it contacts, the methods comprising adding to the crude oil a sufficient corrosion inhibiting amount of the reaction product of an alkynediol and a polyalkylene polyamine. Substantially anaerobic is defined as an environment that has little oxygen present in relation to total hydrocarbon present.

The conditions under which the reaction product is formed are described in U.S. Pat. No. 3,211,667, the contents of which are wholly incorporated herein.

The alkynediols and alkenediols taught to be effective in producing the reaction product are those containing 4 to 12 carbon atoms. Preferably, the alkynediols contain 4 carbon atoms. An exemplary alkynediol is butynediol.

The polyalkylene polyamine compounds taught to be effective in producing the reaction product are those containing 2 to 10 amine groups, and preferably, 3 to 7 amine groups. These amine groups can be substituted or unsubstituted and each is separated by an alkylene group having from 1 to 6 carbon atoms, with 2 to 4 being preferred. Exemplary polyamines include ethylene diamine, diethylene triamine, pentaethylene hexamine, pentapropylene hexamine, triheptylene diamine, and the like.

The weight ratio of the reactants are such as to attain full reaction between the respective ingredients with weight ratios of amine to diol of 4:1 to 1:1, with 3:1 being preferred. An ionizable compound of copper, such as copper acetate, is employed in this reaction in catalytic amounts.

The reaction product of the present invention can be added to the hydrocarbon in an amount which is sufficient to inhibit corrosion of the metal surfaces. The reaction product may be added to the pipeline in an amount ranging from 0.5 parts to about 500 parts per million parts of water present in the pipeline. Preferably, from about 20 to 100 parts per million parts water are added.

The reaction product of the present invention is added to the pipeline in either a solvent or in neat form. Preferably, the reaction product is added in an aqueous solvent. The reaction product can be added to the hydrocarbon along with other suitable ingredients, such as antifoams, corrosion inhibitors, and the like. Given the substantially anaerobic conditions of the pipelines, anaerobic bacteria may also be present and contribute to corrosion. Biocidal compositions may also be utilized in these situations.

The hydrocarbons in the pipeline are generally at ambient temperatures and only need high energy input when types of resids and vacuum resids need to be transported. These transport temperatures can range from about 32° F. to generally no more than 120° F. depending upon the type of hydrocarbon present in the pipeline.

The data set forth below demonstrate the unexpected results occasioned by use of this invention. The following examples are included as being an illustration of the invention and should not be construed as limiting the scope thereof.

EXAMPLES

Product A was prepared utilizing 51.4 pounds of 35% active butynediol, and 48.6 pounds of pentaethylene hexamine, with copper acetate (0.5% aqueous) added as a catalyst. The ingredients were premixed and agitated until a complete mixture was ensured. The premix was then placed in a reactor with distillation unit and the temperature brought up to, controlled and maintained at 350°–400° F. for a time sufficient to ensure total reaction. The resulting material was combined with water and a commercial antifoam for testing.

Testing was performed to evaluate the effectiveness of the inventive inhibitor to inhibit corrosion caused by water. A synthetic brine was prepared having total dissolved solids (TDS) of approximately 160,000 ppm and a pH of 6. This brine had the following constituents:

| | |
|---|---|
| NaCl | 117.0 g/l |
| $CaCl_2.2H_2O$ | 36.8 g/l |
| $MgCl_2.6H_2O$ | 7.9 g/l |
| $NaHCO_3$ | 0.7 g/l |
| $Na_2SO_4$ | 0.7 g/l |

The inhibitor to be tested is dissolved in the brine and the brine is then introduced to the crude oil at 20% volume. The crude oil/brine mixture is then rotated for 24 hours after which the water is removed and prepared for corrosion testing. The corrosion tests are performed at 37° C. using standard mild steel shimstock coupons and rotated for a period of 72 hours. This comparative testing evaluates coupon weight loss against dosage. The test results are presented in Table I.

TABLE I

Corrosion inhibitor evaluation
Brine: 150,000 ppm TDS, $CO_2$ 2000 ppm, approx. 100 ppm $H_2S$
37° C. water temperature

| Inhibitor | Concentration (ppm) | Weight Loss (mg) | Corrosion Rate (mpy) |
|---|---|---|---|
| Control | — | 58.70 | 5.87 |
| Product A | 10 | 17.80 | 1.76 |
| Product A | 20 | 7.80 | 0.78 |
| Product A | 30 | 4.30 | 0.43 |
| Product A | 50 | 4.90 | 0.49 |
| Product A | 100 | 5.90 | 0.69 |
| Control | — | 63.30 | 6.33 |
| Comp. Product B | 10 | 53.40 | 5.34 |
| Comp. Product B | 20 | 37.80 | 3.78 |
| Comp. Product B | 30 | 4.80 | 0.48 |
| Comp. Product B | 50 | 3.40 | 0.34 |
| Comp. Product B | 100 | 2.60 | 0.26 |

Product A is 49.5% of the reaction product of butynediol with pentaethylene hexamine, 1.0% SAG ®10, and 49.5% water
Product B is a commercially available inhibitor formulated to reduce corrosion and hydrogen permeation in wet hydrogen sulfide environments
SAG ®10 is a defoamer available from Union Carbide Table I shows that the inventive treatment provides improved steel corrosion inhibition over the commercial inhibitor in the 10–30 ppm dosage range. Comparable corrosion inhibition results were obtained at other dosages.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention

Having thus described the invention, what we claim is:

1. A method for inhibiting the corrosion of metal surfaces in oil transportation pipelines containing hydrocarbons at a temperature of about 32° F. to about 120° F. and having a separate water layer present therein under substantially anaerobic conditions, wherein said water is oxygen free and contains chloride and sulfate ions which contribute to corrosion of the metal surfaces that said water layer contacts, comprising adding to said hydrocarbons a sufficient corrosion inhibiting amount of the reaction product of an alkynediol and a polyalkylene polyamine.

2. The method as claimed in claim 1 wherein said alkynediol contains an alkyne group having from about 4 to 12 carbon atoms.

3. The method as claimed in claim 1 wherein said alkynediol is butynediol.

4. The method as claimed in claim 1 wherein said polyalkylene polyamine contains from 2 to 10 amine groups, each separated from another by an alkylene group having from 1 to 6 carbon atoms.

5. The method as claimed in claim 1 wherein said polyalkylene polyamine is pentaethylene hexamine.

6. The method as claimed in claim 1 wherein said reaction product is added to said hydrocarbon in an amount ranging from 0.5 parts to about 500 parts per million parts water.

7. The method as claimed in claim 1 wherein said hydrocarbon is at a temperature from about 55° F. to about 120° F.

8. The method as claimed in claim 1 wherein said reaction product is added to said hydrocarbon in an aqueous solvent.

9. The method as claimed in claim 1 wherein said metal surfaces are iron-containing metal surfaces.

* * * * *